(12) United States Patent
Hartley

(10) Patent No.: US 11,391,190 B2
(45) Date of Patent: Jul. 19, 2022

(54) COMBINED CATALYST PRECURSOR/SURFACTANT MIXTURE FOR REDUCTANT UREA SOLUTION FOR SELECTIVE CATALYTIC REDUCTION

(71) Applicant: Southwest Research Institute, San Antonio, TX (US)

(72) Inventor: Ryan Christian Hartley, Kerrville, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 203 days.

(21) Appl. No.: 16/825,634

(22) Filed: Mar. 20, 2020

(65) Prior Publication Data

US 2021/0293169 A1 Sep. 23, 2021

(51) Int. Cl.
| | |
|---|---|
| *F01N 3/00* | (2006.01) |
| *F01N 3/20* | (2006.01) |
| *F01N 3/08* | (2006.01) |
| *B01J 31/16* | (2006.01) |
| *B01D 53/94* | (2006.01) |

(52) U.S. Cl.
CPC ....... *F01N 3/2066* (2013.01); *B01D 53/9418* (2013.01); *B01J 31/1616* (2013.01); *F01N 3/0842* (2013.01); *B01D 2255/705* (2013.01); *F01N 2610/02* (2013.01)

(58) Field of Classification Search
CPC .. F01N 3/2066; F01N 3/0842; F01N 2610/02; B01D 53/9418; B01D 2255/705; B01D 2255/20707; B01D 2258/012; B01D 2251/21; B01D 2251/206; B01J 31/1616; B01J 21/063; C01C 1/086

USPC .......................................................... 60/274
See application file for complete search history.

(56) References Cited

U.S. PATENT DOCUMENTS

| | | | |
|---|---|---|---|
| 4,604,102 A | 8/1986 | Zaweski et al. | |
| 10,267,196 B1* | 4/2019 | Hartley | ................ F01N 3/2066 |
| 10,378,411 B1* | 8/2019 | Henry | ....................... C01C 1/08 |
| 10,774,715 B1* | 9/2020 | Hartley | ................ F01N 3/2896 |
| 2005/0183324 A1 | 8/2005 | Marelli | |
| 2010/0015022 A1 | 1/2010 | Schmelzle et al. | |
| 2011/0233461 A1 | 9/2011 | Wasow et al. | |
| 2013/0192206 A1* | 8/2013 | Keghelian | ............... F01N 3/208 60/274 |
| 2014/0230433 A1* | 8/2014 | Yacoub | ................. F02B 37/168 60/605.1 |
| 2014/0373508 A1* | 12/2014 | van Vuuren | ............ F01N 3/208 60/274 |

(Continued)

OTHER PUBLICATIONS

Lecompte, M.; Obiols, J.; Cherel, J.; Raux, S., The Benefits of Diesel Exhaust Fluid (DEF) Additivation on Urea-Derived Deposits Formation in a Close-Coupled Diesel SCR on Filter Exhaust Line. SAE International Journal of Fuels and Lubricants 2017, 10 (3)).

(Continued)

*Primary Examiner* — Jason D Shanske
(74) *Attorney, Agent, or Firm* — Grossman, Tucker, Perreault & Pfleger, PLLC

(57) ABSTRACT

A dosing composition and method for treatment of reductant urea solutions utilizing organometallic catalyst precursors in combination with one or more surfactants to promote decomposition of relatively high molecular weight deposits which deposits may otherwise reduce selective catalytic reduction efficiency.

17 Claims, 8 Drawing Sheets

(56) References Cited

U.S. PATENT DOCUMENTS

2018/0353904 A1  12/2018  Collin

OTHER PUBLICATIONS

International Search Report & Written Opinion of PCT/US2020/23957 dated Jul. 17, 2020 (13 pgs).

* cited by examiner

COMBINED CATALYST PRECURSOR/SURFACTANT MIXTURE FOR REDUCTANT UREA SOLUTION FOR SELECTIVE CATALYTIC REDUCTION

FIELD

The present disclosure is directed at a dosing composition and method for treatment of reductant urea solutions utilizing organometallic catalyst precursors in combination with one or more surfactants to promote decomposition of relatively high molecular weight deposits which deposits may otherwise reduce selective catalytic reduction efficiency.

BACKGROUND

Internal combustion engines such as those found in cars and trucks may produce combustion byproducts and/or products of incomplete combustion which may exist in the engine exhaust and emit into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

Attention is directed to U.S. Pat. No. 10,267,196 entitled Treatment Of Reductant Urea Solutions With Catalyst Precursors To Assist Elective Catalytic Reduction. Disclosed therein is the treatment of reductant urea solutions with water soluble organometallic catalyst precursors which convert to active catalyst compounds in diesel exhaust gas systems. The active catalyst then promotes hydrolysis of isocyanic acid into ammonia and/or decomposition of relatively high molecular weight deposits which deposits may otherwise reduce selective catalytic reduction efficiency.

Attention is also directed to U.S. Pat. No. 10,378,411 entitled Dosing Method And Apparatus For Reductant Urea Solutions With Catalyst Precursors To Assist Selective Catalytic Reduction." Disclosed therein is a dosing method and apparatus for treatment of reductant urea solutions with water soluble organometallic catalyst precursors which convert to active catalyst compounds in diesel exhaust systems.

SUMMARY

A method for reducing deposits in a diesel engine exhaust system comprising: providing a diesel emission fluid (DEF) containing an aqueous based urea solution including a catalyst precursor comprising a water soluble organometallic compound in combination with a surfactant; introducing said diesel emission fluid into the diesel exhaust wherein said urea converts to ammonia and isocyanic acid; converting the isocyanic acid to ammonia wherein said ammonia is provided to a selective catalytic reduction system and reacts with said oxides of nitrogen and provides nitrogen and water and reducing the formation of deposits in said engine exhaust system.

A method for reducing deposits in a diesel engine exhaust system comprising: providing a diesel emission fluid (DEF) containing an aqueous based urea solution including a catalyst precursor comprising a water soluble organometallic compound present in said solution at a level of 0.01 wt. % to 25.0 wt. % in combination with a surfactant present in said solution at a level of 0.01 wt. % to 10.00 wt. %; introducing said diesel emission fluid into the diesel exhaust wherein said urea converts to ammonia and isocyanic acid; converting the isocyanic acid to ammonia wherein said ammonia is provided to a selective catalytic reduction system and reacts with said oxides of nitrogen and provides nitrogen and water and reducing the formation of deposits in said engine exhaust system.

A formulation for reducing deposits in a diesel emissions exhaust system comprising: an aqueous based solution of urea; a water soluble organometallic precursor present in said aqueous based solution of urea at a level of 0.01 wt. % to 25.0 wt. %; and a surfactant present in said aqueous based urea solution at a level of 0.01 wt. % to 10.0 wt. %.

BRIEF DESCRIPTION OF THE DRAWINGS

The various aspects and advantages of the present disclosure may be better understood by reference to the following detailed description, in conjunction with the accompanying drawings, wherein.

DETAILED DESCRIPTION

Urea is used as a convenient source of ammonia ($NH_3$) reductant in SCR systems for decreasing NOx emissions from diesel engines. Urea ($H_2NCONH_2$) is therefore a component of what is termed a diesel emission fluid (DEF) that is preferably introduced as a spray into the exhaust gases upstream of the SCR catalyst. The DEF vaporizes and the urea thermally decomposes into $NH_3$ and HNCO (isocyanic acid), with subsequent hydrolysis of the HNCO into additional amounts of $NH_3$ along with $CO_2$:

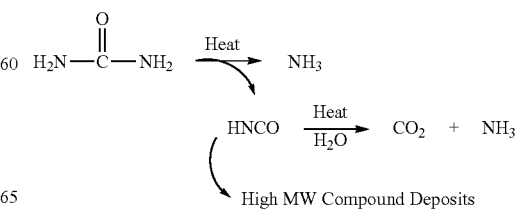

The ammonia as formed above may then be utilized as the reductant in selective catalytic reduction (SCR) to reduce NOx to nitrogen and water. Such reactions include the following:

$$4NH_3 + 4NO + O_2 \rightarrow 4N_2 + 6H_2O$$

$$2NH_3 + NO + NO_2 \rightarrow 2N_2 + 3H_2O$$

$$8NH_3 + 6NO_2 \rightarrow 7N_2 + 12H_2O$$

However, urea is observed to deposit on the walls of the exhaust system and/or the SCR catalyst as solid urea or as a deposit mixture of urea and isocyanic acid. Over time, in the presence of relatively hot exhaust gases, secondary reactions can occur in which such deposits (urea and isocyanic acid) convert to a range of relatively higher molecular weight compounds. Such higher molecular weight compound deposits may include one or more of the following:

TABLE 1

Deposits On Exhaust System Or SCR Catalyst

| Compound | Structure |
|---|---|
| Biuret | 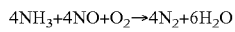 |
| Triuret | |
| Cyanuric Acid | |
| Ammelide | |
| Ammeline | |
| Melamine | |

The deposits, once formed, then serve to reduce the efficiency of the exhaust gas treatment by either reducing exhaust gas flow and/or reducing efficiency of the SCR catalyst from efficient reaction with ammonia to reduce NOx gas concentration. In addition, although heating to elevated temperature such as in the range of 193° C. to 700° C. can serve to decompose the above identified relatively high molecular weight deposits, as well as polymeric type deposits, it can be appreciated that this adds a level of complexity to the system and potential for other associated problems.

Figure 1:
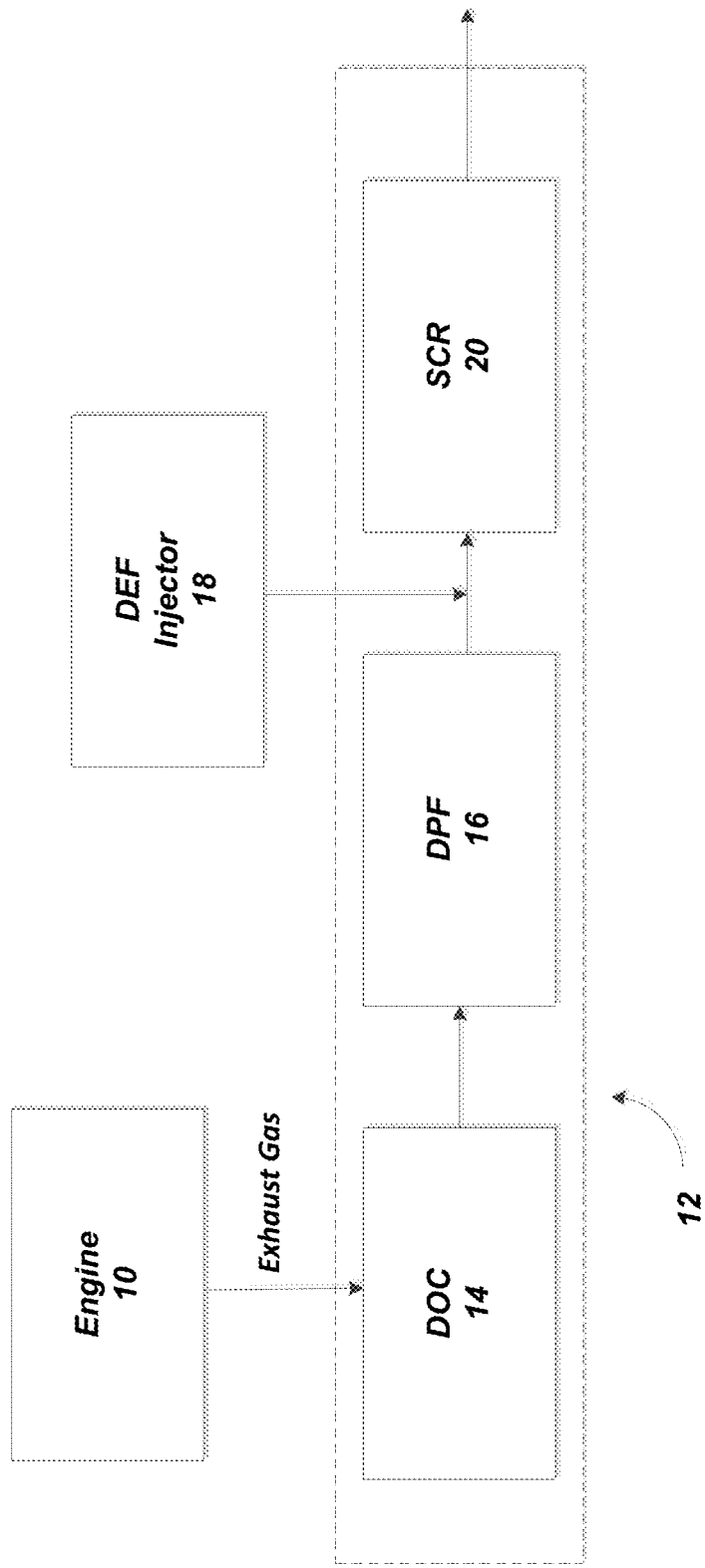
FIG. 1 illustrates in block diagram form an overview of a diesel engine outputting exhaust gas to an exhaust gas after-treatment system.

Attention is directed to FIG. 1, which provides in block diagram form an overview of a compression ignition engine 10, such as a diesel engine, outputting exhaust gas to an exhaust after-treatment system 12 which may include a diesel oxidation catalyst (DOC) 14 which connects to a diesel particulate filter (DPF) 16 which then feeds the selective catalyst reduction (SCR) system 20. A diesel emission fluid (DEF) injector is provided at 18 which contains an aqueous based urea solution that now also includes a catalyst precursor. Preferably the aqueous based urea solutions that are employed typically include those having 30.0 wt. % to 40.0 wt. % urea, and preferably 32.5 wt. % urea.

The catalyst precursor herein is preferably one that has a requisite amount of solubility in the aqueous urea solution and which then is capable of decomposition at temperatures similar to those that are relied upon to convert urea into ammonia. Preferably, the temperature range for decomposition of the catalyst precursor is 45° C. to 180° C., more preferably in the range of 75° C. to 125° C. Such catalyst precursors, upon decomposition at such temperatures in the exhaust gas after-treatment system will then operate to provide a target catalyst which serves to achieve one or more of the following: (1) hydrolyze the isocyanic acid to form ammonia to assist in SCR; (2) reduce and/or eliminate the build-up of relatively higher molecular weight deposits that would otherwise be formed from the isocyanic acid; and (3) decompose the relatively higher molecular weight deposit compounds found in the exhaust gas after treatment system, such as within the SCR system 20 (e.g., biuret, triuret, cyanuric acid, ammelide, ammeline, and/or melamine). This decomposition is contemplated to occur at temperatures that are lower than the temperatures that are typically relied upon for their thermal decomposition (e.g. pyrolysis) and removal.

The catalyst precursors herein preferably include water soluble organometallic compounds that will upon decomposition provide the catalytic activity noted above. Preferably, such organometallic compounds include titanium acetates such as titanium(IV) acetate ($Ca_8H_{12}O_8Ti$) which is water soluble and has a boiling point of 117° C. and which is therefore suitable for use as part of the diesel emission fluid. Upon heating (exposure to elevated temperature exhaust gases) the titanium(IV) acetate will decomposes to provide catalytic titanium oxide which may proceed according to the following general reaction:

$$C_8H_{12}O_8Ti + 8O_2 \rightarrow TiO_2 + 8CO_2 + 6H_2O$$

Accordingly, the titanium oxide ($TiO_2$) as the target catalyst will now conveniently serve to improve the exhaust gas treatment by hydrolyzing the isocyanic acid present to ammonia in order to reduce and/or eliminate the build-up of relatively higher molecular weight deposits. In addition, as noted, the $TiO_2$ can also allow for decomposition of any relatively high molecular weight deposits that may be present, and allow for such decomposition at relatively lower temperatures than ordinarily used for thermal (pyrolytic) decomposition.

Other water soluble organometallics that may be combined in the DEF are contemplated to include titanium(IV) bis(ammonium lactato)dihydroxide ($C_6H_{18}N_2O_8Ti$), which is another water soluble titanium complex and is available as a 50 wt. % in water solution (Sigma-Aldrich) with a flash point of 27° C. Accordingly, upon exposure to elevated temperatures in the exhaust gases, the following accounts for the formation of the target titanium dioxide catalyst:

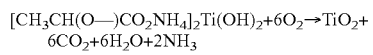
[CH$_3$CH(O—)CO$_2$NH$_4$]$_2$Ti(OH)$_2$+6O$_2$→TiO$_2$+ 6CO$_2$+6H$_2$O+2NH$_3$ Another candidate catalyst precursor is contemplated to include titanium(III)oxalate decahydrate (Ti$_2$(C$_2$O$_4$)$_3$·10H$_2$O). It may therefore be appreciated the preferably, the catalyst precursor may therefore comprise one or more of titanium(IV) acetate, Ti(IV)bis(ammonium lactato)dihydroxide or titanium(III)oxalate. Accordingly, mixtures of such water soluble organometallic catalyst precursors may be employed.

Other preferred catalyst precursors are contemplated to include ammonium titanyl oxalate (ATO), C$_4$O$_9$N$_2$H$_8$Ti, having the following structure:

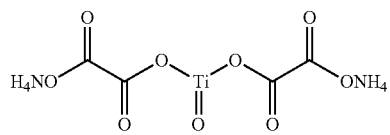

A still further preferred precursor includes titanium oxyacetylacetonate, C$_{10}$H$_{14}$O$_5$Ti having the following structure:

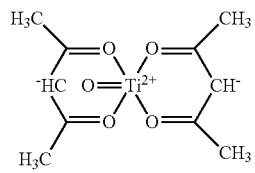

A still further preferred precursor includes Zr$^{4+}$ compounds such as zirconia dioxide (ZrO$_2$). Similar to TiO$_2$ disclosed above, it is contemplated that ZrO$_2$ can similarly serve to improve the exhaust gas treatment by hydrolyzing the isocyanic acid present to ammonia:

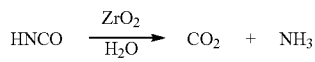

It is therefore contemplated herein that with respect to a given urea-water solution containing a catalyst precursor comprising a water soluble organometallic compound, such as an organometallic compound as noted above that decomposes to form TiO$_2$, one may include a Zr$^{4+}$ type compound, such as ZrO$_2$. As may now be appreciated, in the event that isocyanic acid deposits are formed on the walls of the exhaust system or SCR catalyst, the ZrO$_2$ can additionally serve to reduce such deposits and improve SCR performance.

Therefore, in the broad context of the present disclosure, the organometallic compounds are preferably selected from organo-titanium compounds, which as noted have solubility in water, wherein the solubility is preferably at a level sufficient to allow the organo-titanium compound, as the catalyst precursor, to decompose in the exhaust gases and provide a sufficient amount of catalyst (TiO$_2$) to then hydrolyze the isocyanic acid present to ammonia. Such water solubility of the organometallic compound catalyst precursor in water is contemplated to be at a level of 0.01 wt. % to 25.0 wt. %, more preferably in the range of 0.01 wt. % to 10.0 wt. %, as well as 0.01 wt. % to 5.0 wt. %. The solubility is such that it is contemplated to be maintained at a temperature range between −11° C. (the freezing point of a 32.5% urea water solution) and 50° C. Reference to the wt. % of the catalyst precursor in the DEF is provided by the following equation:

$$\text{Wt. \% Precursor In DEF Solution} = \left\{ \frac{\text{Mass of Catalyst Precursor}}{\text{Mass of Catalyst Precursor} + \text{Mass of Urea} + \text{Mass of Water}} \right\} * 100\%$$

It is further contemplated the amount of catalyst, derived from the water soluble organometallic precursor, is then preferably formed in the exhaust after-treatment system 12 at a level of 0.01 wt. % to 1.0 wt. % within the introduced DEF comprising the aqueous urea solution. Accordingly, one may preferably employ an amount of, e.g. titanium(IV) acetate (C$_8$H$_{12}$O$_8$Ti) precursor in the aqueous urea solution, such that upon delivery and decomposition to titanium oxide in the exhaust gas after-treatment system, the level of titanium oxide in the injected DEF is in the range of 0.01 wt. % to 1.0 wt. %. Moreover, as alluded to above, one may optionally include ZrO$_2$ in the urea water solution to augment the ability to reduce isocyanic acid deposits. Therefore, it is contemplated that the level of ZrO$_2$ in the urea-water solution, either on its own or in combination with the organometallic precursor catalyst, is similarly in the range of 0.01 wt. % to 1.0 wt. %.

Figure 2:
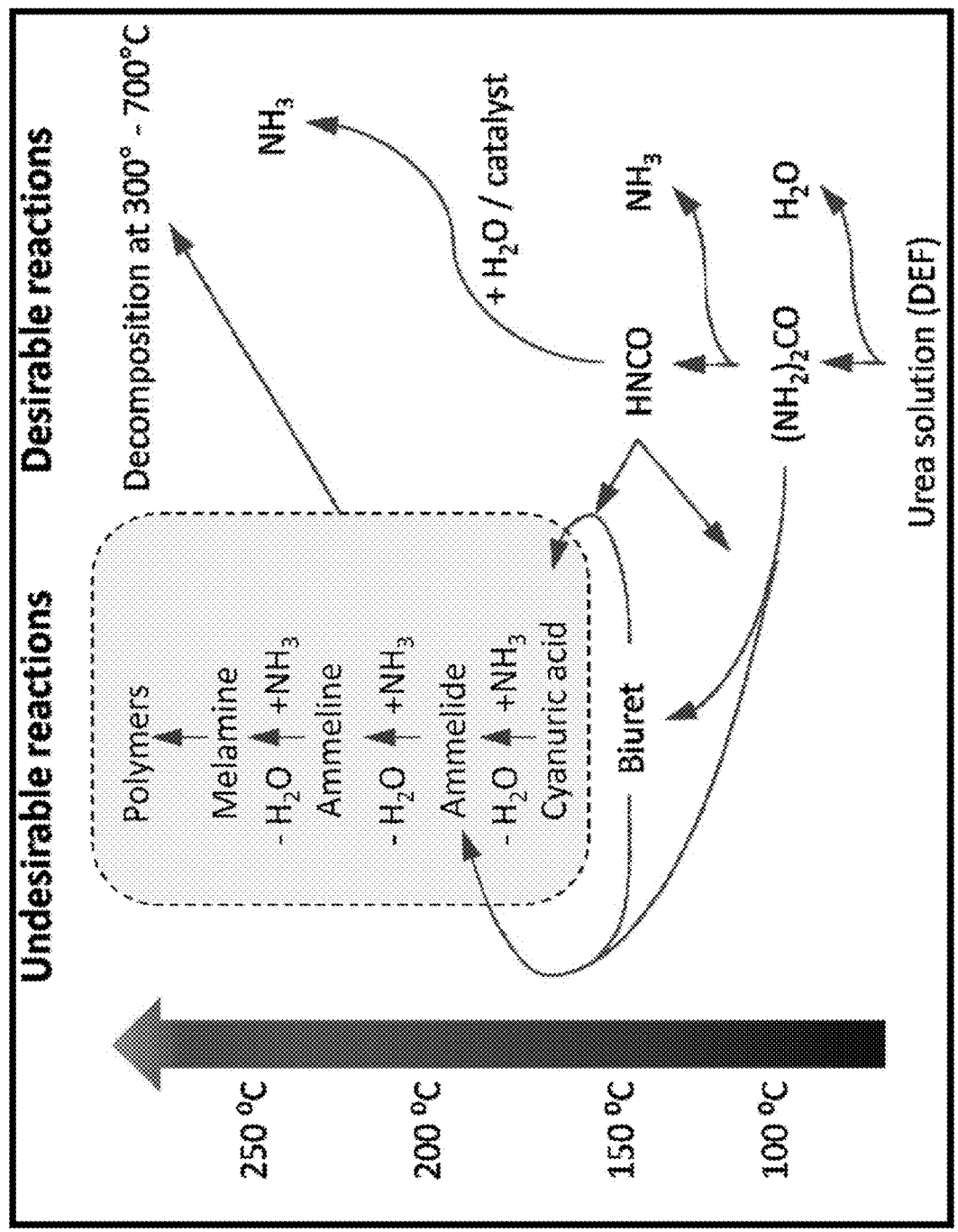
FIG. 2 illustrates the potential reactions of urea in the exhaust gas environment of a SCR system.

Attention is next directed to FIG. 2 which now provides another useful overview of the disclosure herein. As can be seen, the DEF (aqueous urea solution) upon exposure to heat from the exhaust gases (~100° C.) will decompose to provide both isocyanic acid and the desirable ammonia for feeding to the SCR system. The isocyanic acid will then be prone to convert, via what is broadly identified as an undesirable reaction pathway, to the relatively higher molecular weight compound deposits, containing one or more of biuret, cyanuric acid, ammelide, ammeline, melamine and other macromolecular and polymer type compounds. Such compounds will then compromise the efficiency of the SCR system to reduce levels of NOx.

Accordingly, by placement of the catalyst precursor herein into the DEF, as shown in FIG. 2, the catalyst precursor is such that upon exposure to exhaust gases and temperatures preferably in the range of about 100° C. to 300° C., the catalyst precursor (soluble organometallic compound) is converted into catalyst (e.g. titanium oxide) and the catalyst reduces or eliminates the conversion of the isocyanic (HNCO) to the relatively high molecular weight deposits. Instead, as illustrated, the isocyanic acid is converted to additional amounts of ammonia for the SCR process. It is noted that deposit formation may be particularly prominent at temperatures in the range of 185° C. to 250° C. Accordingly, the use of the catalyst precursors herein to reduce deposition formation that occur in the temperature range of 185° C. to 250° C. is particularly advantageous.

In addition, the catalyst precursors herein can serve to facilitate a relatively lower temperature degradation of the relatively high molecular weight compounds forming the deposits comprising biuret, cyanuric acid, ammelide, ammeline and melamine, and such degradation may now occur in the temperature range of 130° C. to 300° C.

Figure 3:
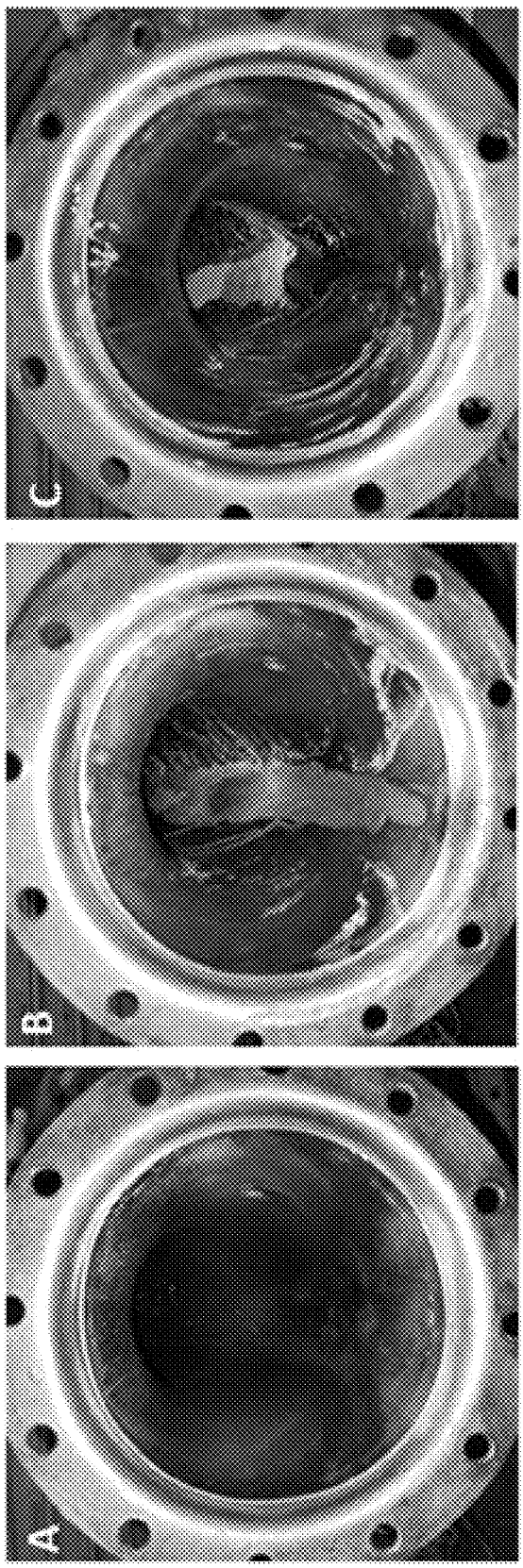
FIG. 3 illustrates the effect of ammonium titanyl oxalate (ATO) addition to urea water solutions with respect to deposit formation.

Reference is next made to FIG. 3 which illustrates in identified images "A", "B" and "C" how the addition of ATO to a urea water solution can impact the formation of deposits. FIG. 3 image "A" has the highest concentration of ATO at 0.1 mol % (1.74 g ATO/liter UWS). FIG. 3 image "B" has a concentration of 0.05 mol % ATO, (0.87 g ATO/liter UWS). FIG. 3 image "C" is UWS without addition ATO. It is apparent that increasing the concentration of ATO incorporated into the UWS results in a decrease in the amount of formed deposits.

Figure 4:
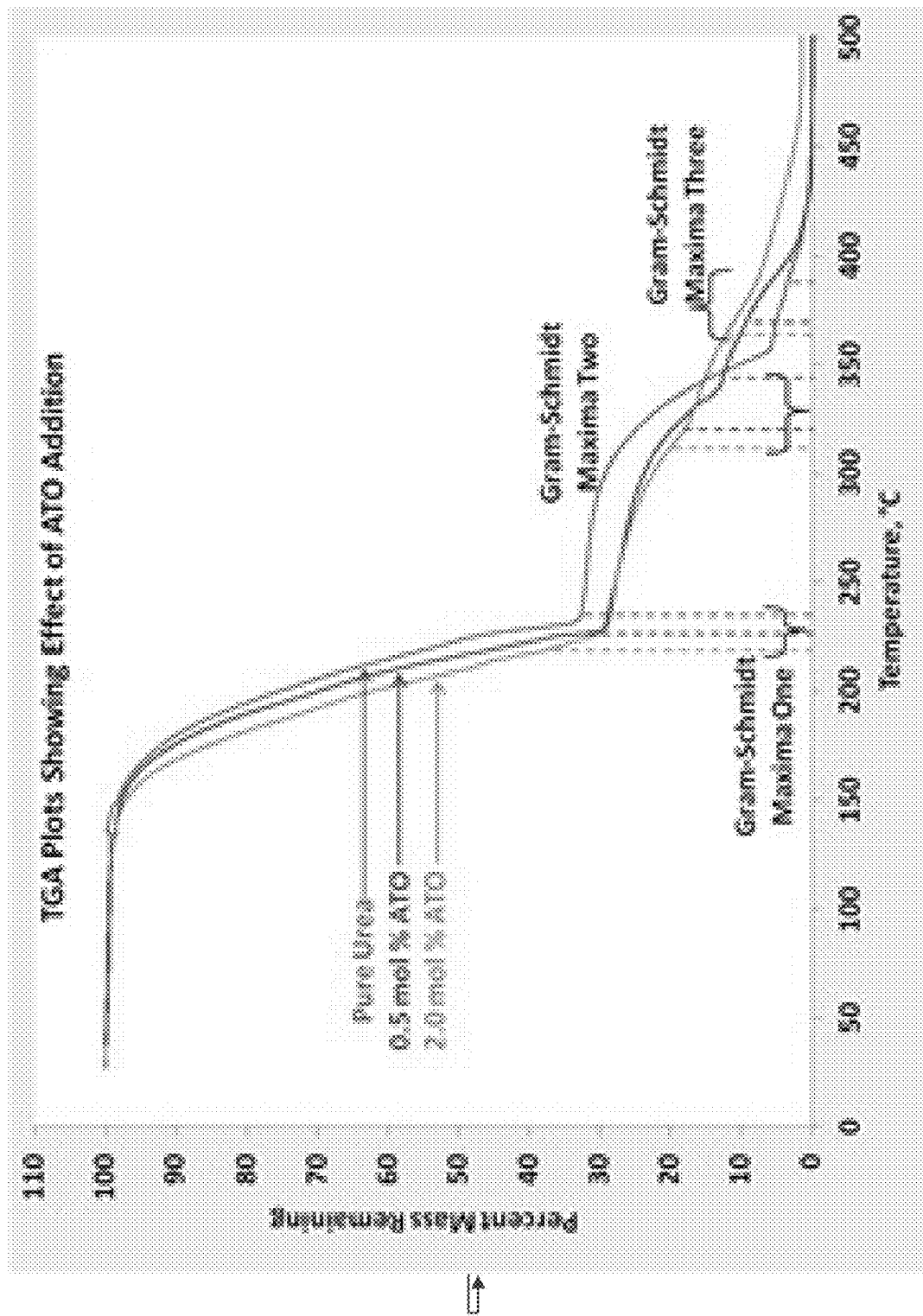
FIG. 4 illustrates the effect of ATO addition to urea water solutions evaluated by thermogravimetric analysis (TGA).

Reference is next made to FIG. 4 which identifies the use of thermogravimetric analysis (TGA) coupled to a Fourier Transform Infrared (FTIR) spectrophotometer. Samples were prepared by incorporating the identified concentration of ATO with urea via lyophilization (freeze drying). Samples then underwent TGA and the evolved gases were analyzed using IR spectroscopy. FIG. 4 shows the overlaid TGA data from three samples: pure urea, 0.5 mol % ATO in urea, and 2.0 mol % ATO in urea. The Gram-Schmidt values shown in the plot are an indication of the temperature at which the maximum amounts of gasses from the sample were evolved. As a general trend, the maximum off-gassing events occurred at lower temperatures as the concentration of ATO in the sample increased. The decrease in the temperatures of Gram-Schmidt maxima indicates that ATO catalyzes the overall decomposition of urea as given by the following reaction:

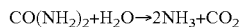

$$CO(NH_2)_2 + H_2O \rightarrow 2NH_3 + CO_2$$

An addition testing evaluation was run to further confirm the use of the catalyst precursors herein to reduce deposits. Two conditions were considered. Condition 1 consisted of a moderate duty cycle injection at relatively low temperature. More specifically, a DEF injector duty cycle of 13.1%, a target gas temperature of 215° C., engine speed of 1375 rpm, exhaust flow of 670 kg/hr for a time of 1.0 hour. Condition 2 consisted of a high duty cycle injection at high temperature. In both cases after 1.0 hour the exhaust pipe was disassembled and deposits were collected and weighed.

For Condition 1, and utilizing a DEF, namely a urea water solution, after 1.0 hour of operation 0.4 g of deposits were recovered from the mixer region and 4.2 g were recovered from the elbow region, with a total amount of deposits of 4.6 g. By contrast, when using 0.2 mol. % ATO in the same urea water solution, only 0.2 g of deposits were recovered from the mixer region and only 0.7 g of deposits were recovered from the elbow region for a total mass of recovered deposits of 0.9 g. As may therefore be appreciated, in the absence of the ATO catalyst precursor the deposit mass increased 411% (0.9 g versus 4.6 g). For Condition 2, and again utilizing a urea water solution, after 1.0 hour of operation, 6.4 g of deposits were recovered from the mixer region. By contrast, when using 0.2 mol. % ATO in the same urea water solution, only 3.5 g of deposits were recovered from the mixer region. As may therefore be appreciated, in the absence of the ATO catalyst precursor the deposit mass increased 45% (6.4 g versus 3.5 g).

The present disclosure builds upon the above with the introduction of one or more surfactants in combination with the organometallic catalyst precursor to provide a synergistic effect towards deposit reduction. Reference to a surfactant is reference to those compounds that reduce the surface tension of the urea water solution. Surfactants are contemplated to therefore include anionic surfactants, which include anionic functional groups (e.g. carboxylates) on one end of a hydrophobic (e.g., hydrocarbon) chain. Surfactants are also contemplated to include cationic surfactants, which include cationic functional groups on the end of the hydrophobic (hydrocarbon) chain. It is also preferably that such surfactants are selected so that they do not contain atoms that would otherwise serve to interfere with the function of the SCR catalyst.

Figure 5:
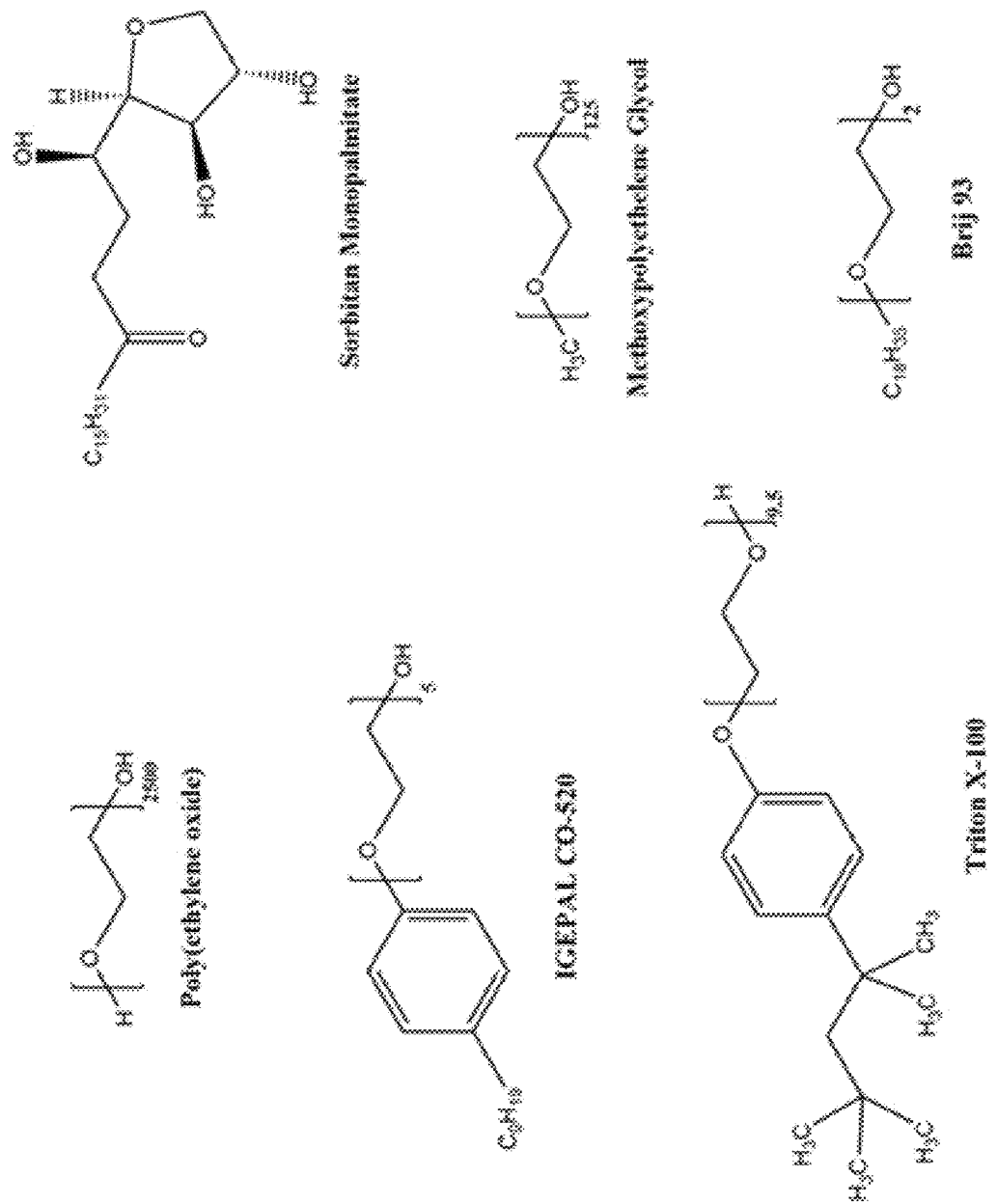
FIG. 5 illustrates various non-ionic surfactants

Preferably, the surfactants that are utilized herein include non-ionic surfactants. Reference to a non-ionic surfactant is reference to the presence of oxygen-containing hydrophilic groups bonded to hydrophobic structure. Such non-ionic surfactants may preferably include the compounds illustrated in FIG. 5. As can be seen, such non-ionic surfactants include poly(ethylene oxide), polyoxyethylene (5) nonylphenyl ether, sold as IGEPAL® CO-520, 2-[4-(2,4,4-trimethylpentan-2-yl)phenoxy]ethanol sold as TRITON™ X-100, sorbitan monopalmitate, methoxy polyethylene glycol and polyethylene glycol oleyl ether sold as Brij® 93. It should therefore be noted that the non-ionic surfactants here are preferably those that contain only carbon, oxygen and hydrogen. In addition, preferably, the non-ionic surfactants are such that they have a number average molecular weight (Mn) of less than 3000, or are in the range of 100-3000.

As noted above, the aqueous based urea solution herein is one that preferably contains the water soluble organometallic catalyst precursor at a level of 0.01 wt. % to 25.0 wt. %. The level of non-ionic surfactant that may now be added to the aqueous based urea solution containing the water soluble organometallic catalyst precursor is preferably in the range of 0.01 wt. % to 10.00 wt. %. More preferably, the level of non-ionic surfactant is present at a level of 0.01 wt. % to 5.00 wt. %, or 0.01 wt. % to 2.5 wt. %, or 0.01 wt. % to 1.5 wt. %.

Figure 6:
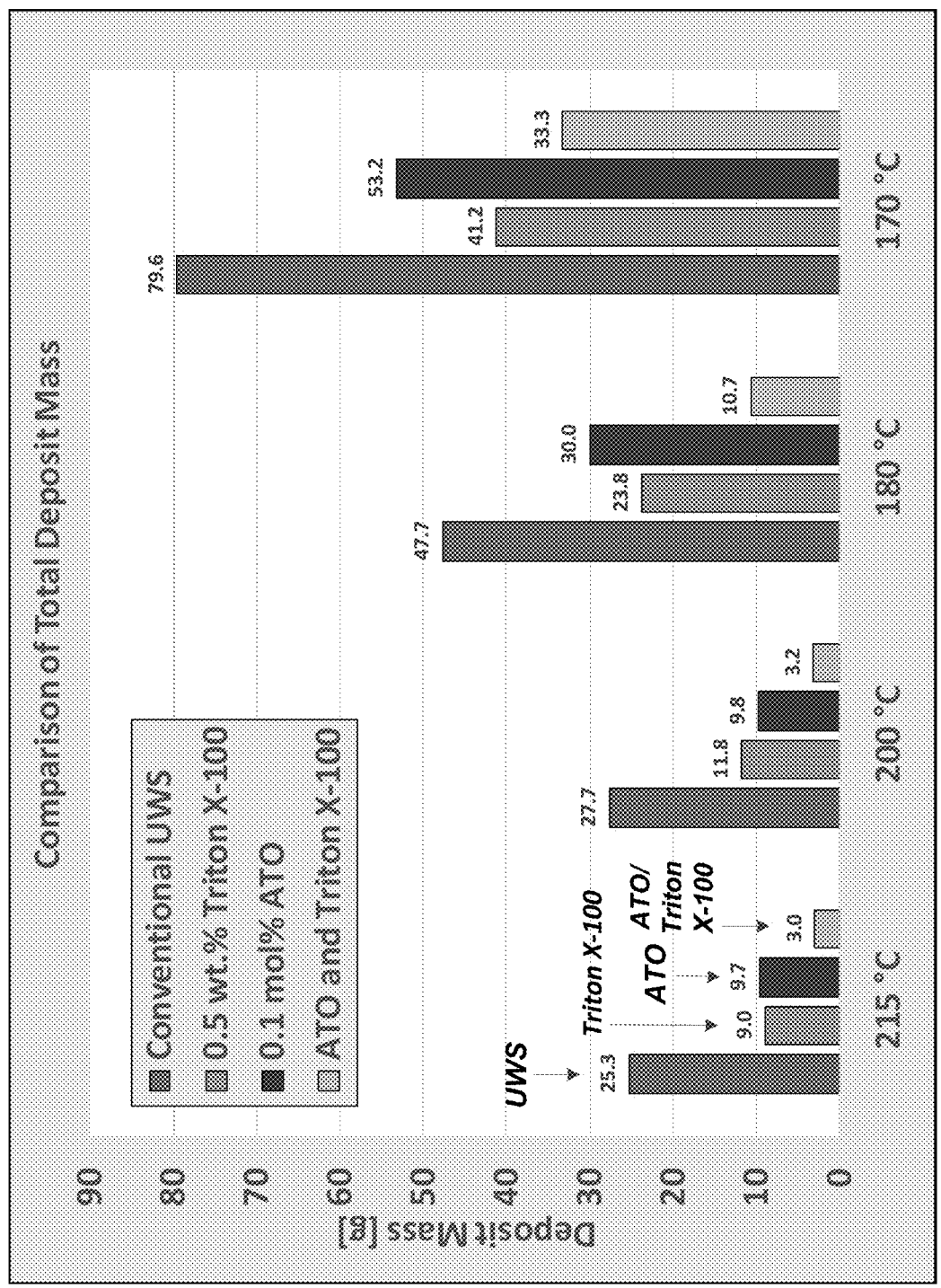
FIG. 6 illustrates the deposit mass (g) versus temperature for the indicated formulations: (1) conventional UWS; (2) 0.5 wt. % Triton™ X-100; (3) ATO; and (4) ATO in combination with Triton™ X-100.
Figure 7:
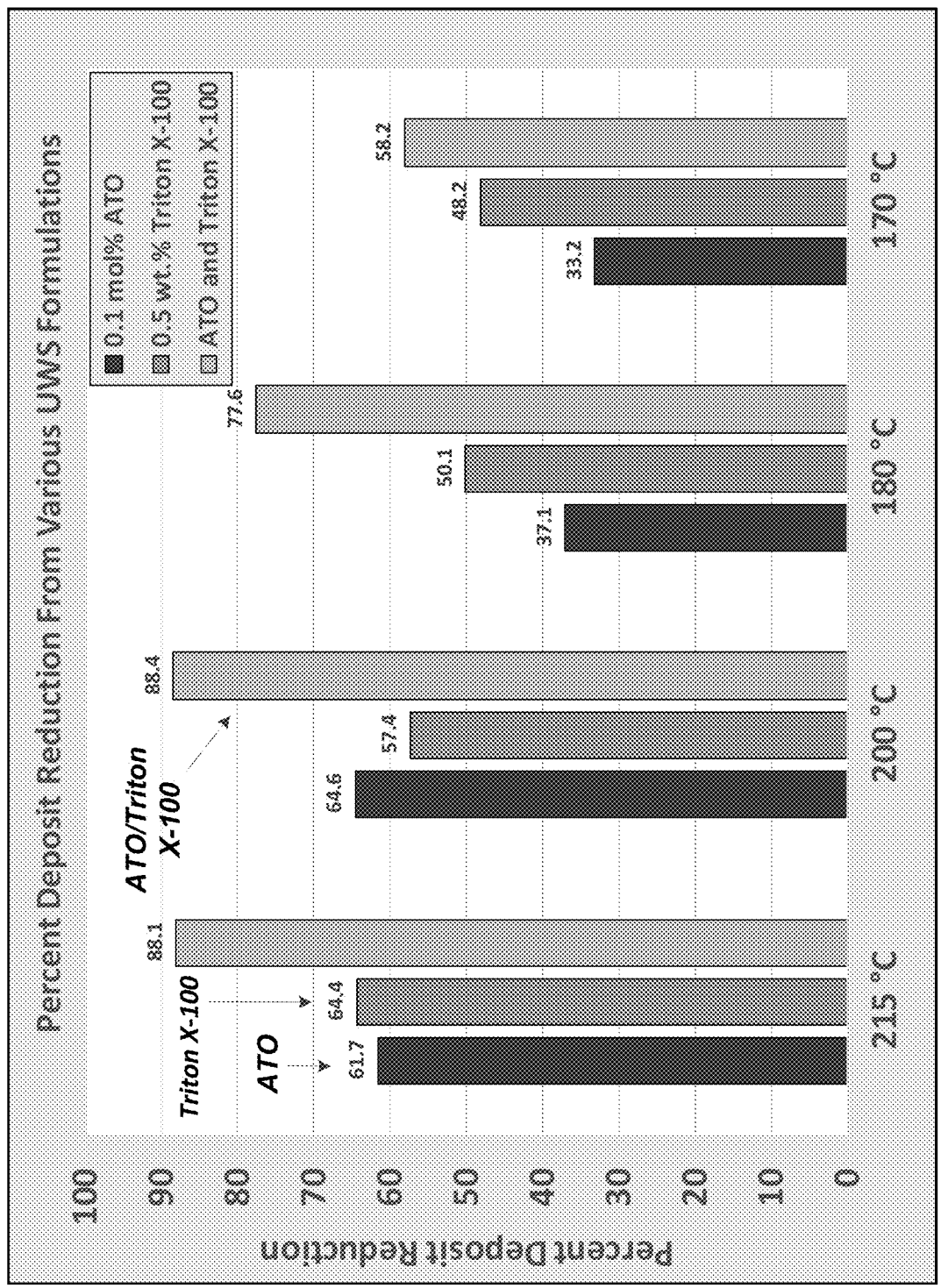
FIG. 7 illustrates the percent deposit reduction versus temperature for the indicated formulations: (1) ATO; (2) 0.5 wt. % Triton™ X-100; and (3) ATO in combination with Triton™ X-100.

Reference is next made to FIGS. 6 and 7, which provides the comparative performance data regarding the use of a representative non-ionic surfactant, TRITON™ X-100, on deposit mass formation in a selective catalyst reduction system, at varying temperature. The bar graphs in sequence reading from left to right, for each respective temperature show the deposit mass (g) for conventional urea water solution (UWS), 0.5 wt. % Triton x-100 in the UWS, 0.1 mol % (0.17 wt. %) ammonium titanyl oxalate (ATO) in the UWS, and 0.1 mol % ATO (0.17 wt. %) and 0.5 wt. % TRITON™ X-100. It is useful to note that at a concentration of 0.5 wt. %, Triton X-100 was found to be completely soluble in UWS at room temperature. UWS with only Triton X-100, and UWS with both Triton X-100 and 0.1 mol % ATO (0.17 wt. %) were evaluated for deposit reduction at temperatures of 215, 200, 180 and 170° C. FIG. 6 provides the total deposit mass that was generated from each solution and FIG. 7 compares the percent deposit reduction for each fluid over unmodified UWS. At the 215 and 200° C. test conditions, ATO and Triton X-100 appeared to display similar activity for deposit reduction. At the 180 and 170° C. test conditions, it appeared that Triton X-100 on its own was relatively more effective at reducing deposits than ATO. When ATO and Triton X-100 were combined, the percent deposit reduction was significantly greater at each temperature point compared to addition ATO or Triton X-100 alone in the UWS. Accordingly, it is contemplated that the organometallic precursor in combination with a non-ionic surfactant, provide that at DEF injection temperatures from 150° C. to 250° C., there is a particularly preferred reduction in deposit formation on the walls of the exhaust system and/or the SCR catalyst.

Figure 8:
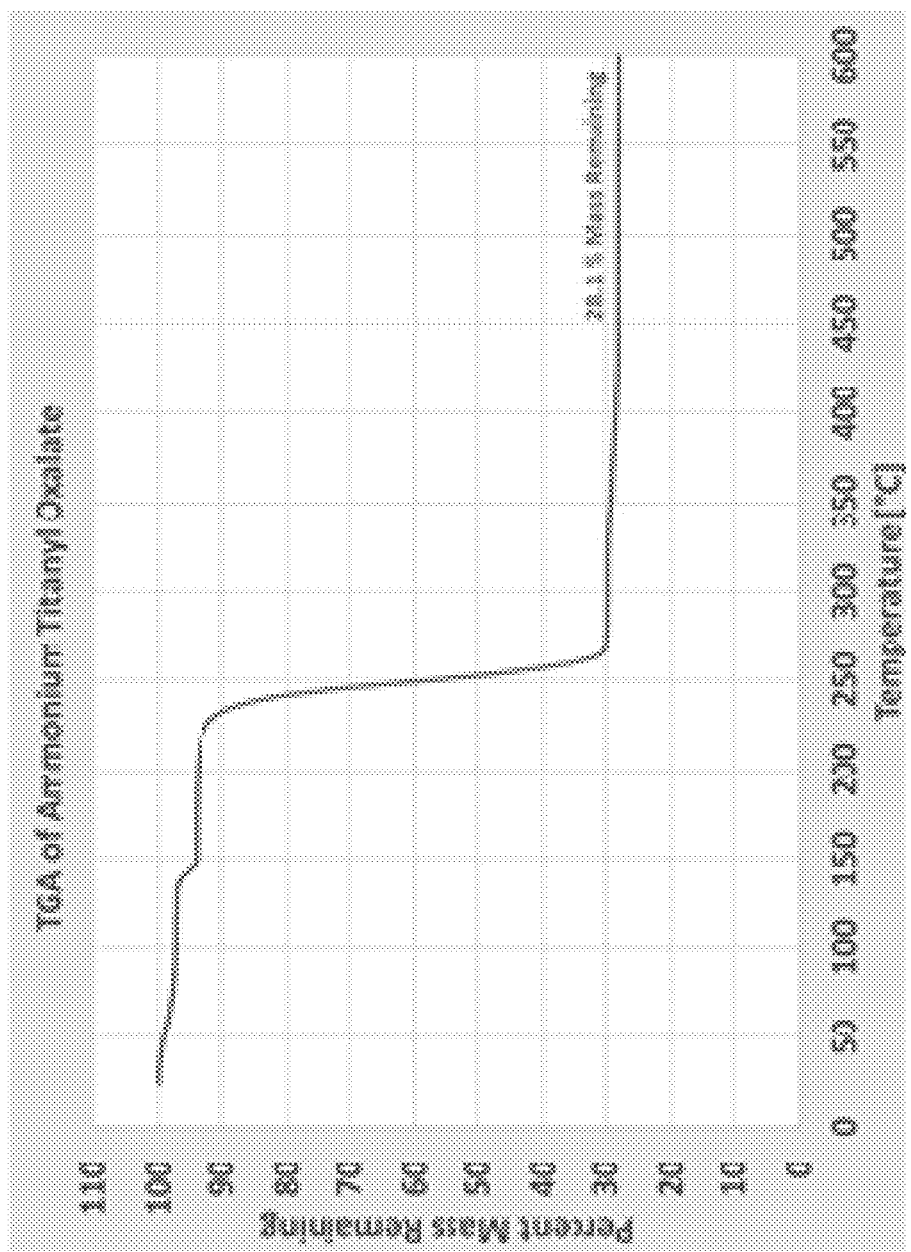
FIG. 8 illustrates the thermogravimetric analysis (TGA) data of ATO.

Attention is next directed to FIG. 8 which displays the thermogravimetric analysis (TGA) data for a representative organometallic precursor herein, ammonium titanyl oxalate (ATO). As can be seen, ATO undergoes a relatively small drop of around 5.0% in weight up to a temperature of about 245° C. and then had a 28.1% mass remaining at the conclusion of the TGA experiment. Reflecting on the above, it was noted that the organometallic precursors herein are such that they were observed to reduce deposits at temperatures of 170° (see again, FIGS. 6 and 7). Accordingly, the organometallic precursors herein are such that in their precursor form, their activity in reducing deposits is present.

From this data, there were also a number of additional observations: (1) the addition of both surfactant and organometallic catalyst precursors described herein to the UWS in a diesel engine exhaust provides a synergistic effect with respect to the reduction of deposits on the walls of the exhaust system and/or the SCR catalyst as compared to the use of the UWS on its own; and (2) this reduction in deposit formation was particularly pronounced at temperatures of 200° C. to 215° C. where deposits were reduced at levels greater than or equal to at least 85% as compared to UWS on its own.

Accordingly, some of the remarkable benefits of the aforementioned use of the catalyst precursors herein in combination with a surfactant in diesel emission fluid (DEF) therefore includes the synergistic capacity to now improve emissions by allowing for DEF injection at relatively lower exhaust temperatures (e.g. 185° C. to 250° C.) to then reduce deposit formation on the walls of the exhaust system that otherwise compromises the efficiency of the SCR system. This synergistic reduction is deposit formation is greater as compared to the use of: (1) a urea-based DEF on its own; (2) a DEF containing a catalyst precursor comprising an organometallic compound; (3) a DEF containing a non-ionic surfactant. In other words, the catalyst precursors in combination with surfactants herein are now particularly preferred for reduced cold start emissions on vehicles equipped with a SCR catalyst. In addition, the synergistic reduction in deposit formation as described herein is such that it is contemplated to reduce system backpressure. System backpressure in turn results in an increase in fuel consumption. By reducing deposits there will therefore be a reduction in fuel consumption in the vehicle. In addition, by reducing deposits, the requirement for a high temperature regeneration period to breakdown and remove the deposits can be reduced or avoided. Furthermore, the identified high molecular weight deposits herein are such that they tend to have corrosive effects when in contact with the metals utilized in exhaust piping. Reduction or removal of such deposits therefore is contemplated to extend the lifetime of the metallic exhaust system and reduce or eliminate loss of its structural integrity.

What is claimed is:

1. A method for reducing deposits in diesel exhaust from a diesel engine exhaust system comprising:
    providing a diesel emission fluid (DEF) containing an aqueous based urea solution including a catalyst precursor comprising a water soluble organometallic compound in combination with a surfactant;
    introducing said diesel emission fluid into the diesel exhaust wherein said urea converts to ammonia and isocyanic acid;
    converting the isocyanic acid to ammonia wherein said ammonia is provided to a selective catalytic reduction system and reacts with said oxides of nitrogen and provides nitrogen and water and reducing the formation of deposits in said diesel engine exhaust system.

2. The method of claim 1 wherein said water soluble organometallic precursor is present in said aqueous based urea solution at a level of 0.01 wt. % to 25.0 wt. %.

3. The method of claim 1 wherein said surfactant is present in said aqueous based urea solution at a level of 0.01 wt. % to 10.00 wt. %.

4. The method of claim 1 wherein said surfactant is selected from one or more of the following: poly(ethylene oxide), polyoxyethylene (5) nonylphenyl ether, 2-[4-(2,4,4-trimethylpentan-2-yl)phenoxy]ethanol, sorbitan monopalmitate, methoxy polyethylene glycol or polyethylene glycol oleyl ether.

5. The method of claim 1 wherein said water soluble organometallic precursor comprises an organo-titanium compound and said surfactant comprises sorbitan monopalmitate, methoxy polyethylene glycol.

6. The method of claim 1 wherein said water soluble organometallic precursor comprises ammonium titanyl oxalate and said surfactant comprises sorbitan monopalmitate, methoxy polyethylene glycol.

7. The method of claim 1 wherein said reduction in the formation of deposits in said diesel engine exhaust system is greater as compared to the use of said urea-based diesel emission fluid on its own.

8. The method of claim 1 wherein said reduction in formation of deposits in said diesel engine exhaust system is greater as compared to the use of said urea-based diesel emission fluid containing said catalyst precursor.

9. The method of claim 1 wherein said reduction in formation of deposits in said diesel engine exhaust system is greater as compared to both: (a) the use of said urea-based diesel emission fluid on its own; and (b) the use of said urea-based diesel emission fluid containing said catalyst precursor.

10. A method for reducing deposits in diesel exhaust from a diesel engine exhaust system comprising:
    providing a diesel emission fluid (DEF) containing an aqueous based urea solution including a catalyst precursor comprising a water soluble organometallic compound present in said solution at a level of 0.01 wt. % to 25.0 wt. % in combination with a surfactant present in said solution at a level of 0.01 wt. % to 10.00 wt. %;
    introducing said diesel emission fluid into the diesel exhaust wherein said urea converts to ammonia and isocyanic acid;
    converting the isocyanic acid to ammonia wherein said ammonia is provided to a selective catalytic reduction system and reacts with said oxides of nitrogen and provides nitrogen and water and reducing the formation of deposits in said diesel engine exhaust system.

11. A formulation for reducing deposits in a diesel engine exhaust system comprising:
    an aqueous based solution of urea;
    a water soluble organometallic precursor present in said aqueous based solution of urea at a level of 0.01 wt. % to 25.0 wt. %; and
    a surfactant present in said aqueous based urea solution at a level of 0.01 wt. % to 10.0 wt. %.

12. The formulation of claim 11 wherein said surfactant is selected from one or more of the following: poly(ethylene oxide), polyoxyethylene (5) nonylphenyl ether, 2-[4-(2,4,4-trimethylpentan-2-yl)phenoxy]ethanol, sorbitan monopalmitate, methoxy polyethylene glycol or polyethylene glycol oleyl ether.

13. The formulation of claim 11 wherein said water soluble organometallic precursor comprises an organo-titanium compound and said surfactant comprises sorbitan monopalmitate, methoxy polyethylene glycol.

14. The formulation of claim 11 wherein said water soluble organometallic precursor comprises ammonium titanyl oxalate and said surfactant comprises sorbitan monopalmitate, methoxy polyethylene glycol.

15. The formulation of claim 11 wherein said formulation provides a reduction in the formation of deposits in said diesel engine exhaust system that is greater as compared to the use of said an aqueous based solution of urea on its own.

16. The formulation of claim 11 wherein said formulation provides a reduction in formation of deposits in said diesel engine exhaust system that is greater as compared to the use of said aqueous based solution of urea containing said water soluble organometallic precursor.

17. The formulation of claim 11 wherein said formulation provides a reduction in formation of deposits in said diesel engine exhaust system that is greater as compared to both: (a) the use of said an aqueous based solution of urea on its own; and (b) the use of said aqueous based solution of urea containing said water soluble organometallic precursor.

\* \* \* \* \*